Patented July 9, 1935

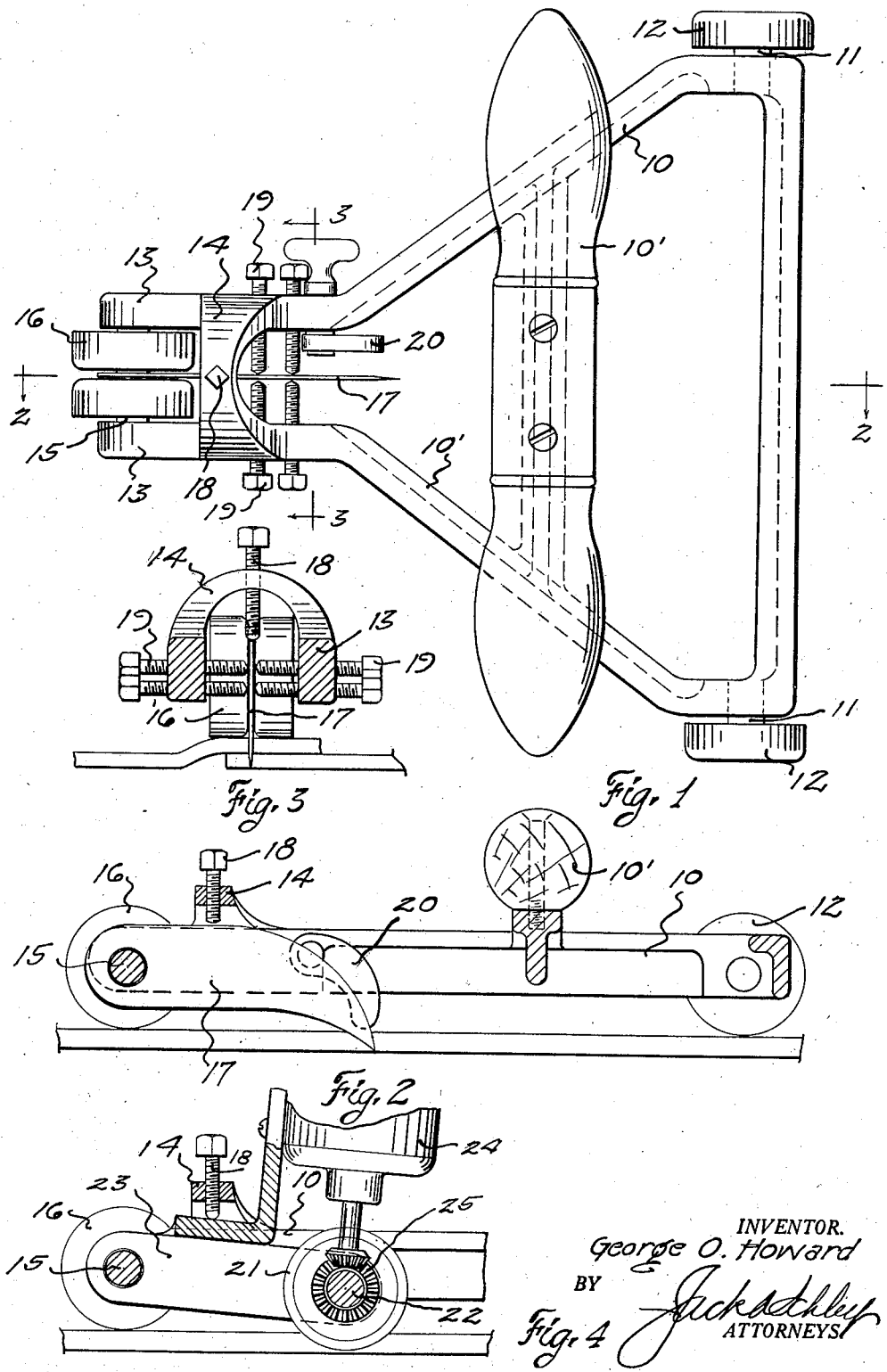

2,007,395

UNITED STATES PATENT OFFICE 2,007,395

CUTTING TOOL

George O. Howard, San Antonio, Tex.

Application May 5, 1934, Serial No. 724,094

8 Claims. (Cl. 164—83)

This invention relates to new and useful improvements in cutting tools.

One object of the invention is to provide an improved cutting tool particularly adapted for use in cutting linoleum, or other similar material.

Another object of the invention is to provide an improved cutting tool for cutting linoleum, including a frame having a cutting blade mounted thereon, said blade being mounted so as to be adjusted vertically to vary its cutting depth, and means for preventing torsional twist and buckling of the knife during the cutting operation.

A further object of the invention is to provide an improved cutting tool for cutting linoleum which includes a rotatable cutting disk which is vertically adjustable to vary its cutting depth.

An important object of the invention is to provide an improved cutting tool for cutting linoleum having a vertically adjustable cutting blade and provided with a guide which guides said tool when the linoleum is to be cut to conform to the edge of a second piece of linoleum.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a plan view of a cutting tool constructed in accordance with the invention, Figure 2 is a longitudinal vertical sectional view taken on the line 2—2 of Figure 1, Figure 3 is a transverse vertical sectional view taken on line 3—3 of Figure 1, and Figure 4 is a detail of another form of the invention.

In the drawing, the numeral 10 designates a triangular shaped frame member which forms the main supporting element of the cutting tool. The member is constructed of metal, or other suitable material, and although I have shown it substantially triangular, it may be of any desired shape. A suitable handle 10' is mounted transversely on the frame. The rear end of the frame member has outwardly extending trunnions 11 at each end thereof and supporting rollers 12 are mounted on these trunnions.

The forward end of the frame member is bent to form a pair of forwardly extending arms 13 which are connected together by an arc 14 which is preferably made integral with said arms. A transverse shaft 15 is secured between the arms at their forward ends and a pair of rollers 16 are mounted on this shaft. It is obvious that the frame member 10 is supported by the rollers 16 and 12 (Fig. 2).

Between the forward rollers 16, a suitable cutting blade 17 is pivotally mounted on the shaft 15, the point of said blade extending rearwardly. An adjusting screw 18 is threaded through the top of the arc 14 and has its lower end engaging the upper edge of the cutting blade. The point of the blade, will, of course, through its own weight engage or rest on the material to be cut. By tightening the set screw, the blade will be forced downwardly, whereby an adjustment of the screw varies the depth which the blade cuts into the material.

For steadying and alining the blade and preventing torsional twist and buckling, a pair of set screws 19 are threaded through each arm 13. The inner ends of the screws engage the sides of the blade (Fig. 1) and not only serve to aline the blade but aid in holding said blade in an adjusted position when the blade is not engaging the material. It will be seen by observing Figure 2 that the blade is positioned so that forward movement of the tool will cause the cutting edge to engage the material.

In operation, the operator, being on his knees grasps the handle 10' and after adjusting the blade to a proper cutting depth moves the tool forwardly keeping the blade on a line, which marks the point where the material is to be cut. It is pointed out that the weight of the operator's body is on the frame and blade thereby making for easier cutting. Usually two pieces of material are cut at the same time as shown in Figure 3 and the cut edges are then matched. However, at times one of the pieces is already cut and it is desired to cut the second piece to conform to the contour of the first.

In such cases, a pivoted guide member 20 which is mounted on one side of the frame 10 is employed. This member is swung downwardly so that its lower end engages the cut edge of the first piece. As the tool is moved forwardly, the member 20 follows the contour of the cut edge causing the cutting blade to follow a similar line, and cutting the second piece of material to perfectly match the first piece.

The tool is constructed of a minimum number of parts, making for cheapness of manufacturing costs. Few adjustments are required. The single screw 18 controls the cutting depth of the blade and the set screws 19 not only hold the blade in alinement and prevent torsional twist, but also aid in keeping said blade in adjusted positions.

The guide member 20 may or may not be used according to the material being cut.

In Figure 4 I have shown another form of the invention wherein a cutting disk 21 is substituted for the blade 17. The disk is journaled on a shaft 22 in the outer end of a hanger bar 23 which is pivotally mounted on the shaft 15. The upper edge of the hanger bar is engaged by the lower end of the adjusting screw 18, whereby tightening of said screw will force the bar downwardly to increase the cutting depth of the disk 20. For driving the disk, a suitable small electric motor 24 has drive connection 25 with said disk, and it is obvious that when the motor is operated, the disk revolves to cut the material. In this form, the tool is moved forwardly in the same manner by the operator.

What I claim and desire to secure by Letters Patent is:

1. A cutting tool comprising, a triangular shaped frame having its apex formed into horizontally extending ears, an operator's handle mounted on the frame near the base thereof, a supporting roller at each end of the base of the frame, a shaft mounted between the ears at the apex of the frame, a pair of supporting rollers journaled on said shaft between the ears, a cutting blade pivotally mounted on the shaft between the latter rollers and having its lower cutting edge engaging material to be cut, and an adjusting screw mounted in the frame above the blade for swinging said blade to vary its cutting depth.

2. A cutting tool comprising, a triangular shaped frame, a supporting roller at each end of said frame, a pair of rollers at the apex of said frame, an operator's handle carried by the frame and positioned nearer the base portion of said frame, a cutting blade pivotally mounted in the frame at the apex of said frame and having its lower cutting edge engaging material to be cut, an adjusting screw engaging the upper edge of said blade for swinging the same to vary its cutting depth, and a plurality of screws mounted in the frame on opposite sides thereof and engaging the sides of the blade at spaced intervals therealong, whereby the blade is clamped between the screws to prevent torsional twist and buckling of the blade.

3. A cutting tool comprising, a triangular shaped frame, a supporting roller at each end of said frame, a pair of rollers at the apex of said frame, an operator's handle carried by the frame and positioned nearer the base portion of said frame, a cutting blade pivotally mounted in the frame at the apex of said frame and having its lower cutting edge engaging material to be cut, an adjusting screw engaging the upper edge of said blade for swinging the same to vary its cutting depth, and a plurality of screws mounted in the frame on opposite sides of the cutting blade, said screws being positioned directly opposite each other and arranged to have their ends engaging the sides of the blade, whereby said blade is securely clamped between the ends of the oppositely positioned screws to prevent torsional twist and buckling of the blade.

4. A cutting tool comprising, a triangular shaped frame having its apex formed into horizontally extending ears, an operator's handle mounted on the frame near the base thereof, a supporting roller at each end of the base of the frame, a shaft mounted between the ears at the apex of the frame, a pair of supporting rollers journaled on said shaft between the ears, a hanger bar pivoted on said shaft between the latter rollers, a circular cutting blade carried by the bar and having its lower edge engaging material to be cut, and an adjusting screw mounted in the frame above the hanger bar and having its lower end engaging said bar to swing the same and vary the cutting depth of the blade.

5. A cutting tool comprising, a frame having a longitudinal opening at its forward end, a pivot shaft extending transversely across said opening at the forward end thereof, a cutting blade having its forward end pivoted on said shaft and extending rearwardly in the opening of said frame, the rear end of said blade being curved downwardly to form a cutting point, and an upright screw carried by the frame and engaging the top edge of the blade for holding the same against upward displacement.

6. A cutting tool comprising, a movable frame having a longitudinal opening at its forward end, a pivot shaft extending transversely across the front end of the frame, a cutting blade having its forward end pivoted on said shaft and extending rearwardly in the opening of said frame, the rear end of said blade being curved downwardly to form a cutting point, an upright screw carried by the frame and engaging the top edge of the blade for holding said blade against upward displacement and a plurality of screws mounted in each side of the frame and extending across the opening thereof, said screws engaging opposite sides of said blade at spaced points, whereby the blade is held against twisting and is solely sustained by said screws and said shaft, and also whereby said blade may be centered under the upright screw.

7. A cutting tool comprising, a movable frame having horizontally extending ears formed at its forward end, a cutting blade pivotally attached at the forward end of said ears and having a downwardly curved cutting point at its opposite end for engaging material to be cut, a vertically extending screw mounted in the frame above the ears intermediate the pivot and point of the blade and engaging the upper edge of said blade, and a plurality of screws mounted in the ears and extending inwardly therefrom, said screws engaging opposite sides of the blade at spaced points, whereby the blade is solely sustained by the screws and may undergo a limited lateral movement to center the blade beneath the vertical screw, and also whereby twisting of said blade is prevented.

8. A cutting tool comprising, a frame, a cutting blade having its forward end loosely pivoted in said frame and extending longitudinally and rearwardly in said frame, and a plurality of adjusting screws mounted in the frame and engaging opposite sides of the blades and located one above the other, whereby the screws may be adjusted to tilt the blade to a vertical inclination, thereby causing the blade to cut material on a bevel.

GEORGE O. HOWARD.